United States Patent
Redmond, Jr.

[11] 3,894,900
[45] July 15, 1975

[54] ELASTOMER-FREE FABRIC SURFACE FOR POWER TRANSMISSION BELT TOOTH FACING

[75] Inventor: John D. Redmond, Jr., Denver, Colo.

[73] Assignee: The Gates Rubber Company, Denver, Colo.

[22] Filed: Sept. 7, 1973

[21] Appl. No.: 395,084

[52] U.S. Cl. ............... 156/138; 156/245; 264/263; 428/169; 428/339; 428/172; 428/179; 428/224; 428/425

[51] Int. Cl.² ...................... B29H 7/22; B29H 3/00

[58] Field of Search ........... 156/137, 138, 139, 140, 156/141; 264/263

[56] References Cited
UNITED STATES PATENTS

| | | |
|---|---|---|
| 3,138,962 | 6/1964 | Haines et al. ................ 156/138 |
| 3,200,180 | 10/1965 | Russ et al. ................... 264/271 |
| 3,580,767 | 5/1971 | Barnes et al. ................. 156/138 |
| 3,607,502 | 9/1971 | Marzocchi et al. ............ 156/137 |
| 3,673,883 | 7/1972 | Adams ......................... 156/138 |

Primary Examiner—George F. Lesmes
Assistant Examiner—William R. Dixon, Jr.
Attorney, Agent, or Firm—Curtis H. Castleman, Jr.; Raymond Fink; H. W. Oberg, Jr.

[57] ABSTRACT

An endless positive drive belt is described having a tensile-loaded castable elastomeric body supporting circumferentially spaced cogs or teeth. The alternating land and teeth portions of the belt carry a layer of wear-resistant fabric, the outer surface of which is free of elastomer due to the presence of a bonded layer of elastomer impervious material. A method for producing the belt is described.

18 Claims, 4 Drawing Figures

3,894,900

ELASTOMER-FREE FABRIC SURFACE FOR POWER TRANSMISSION BELT TOOTH FACING

BACKGROUND OF THE INVENTION

This invention relates to endless belts of the cog type containing a shear, abrasion and noise resistant inner cover element which is substantially free of elastomer at its surface, and further relates to a method for producing such belts. This invention relates to and defines an improvement over my co-pending application Ser. No. 189,440, filed Oct. 14, 1971, now U.S. Pat. No. 3,772,929, and assigned to the assignee of the subject invention and hereby incorporated by reference.

It has been recognized that power transmission belts constructed of a castable elastomer, e.g. liquid polyurethane, offer a number of significant advantages over conventional rubber belting. Among these advantages are that the liquid cast belt is less susceptible to flex fatigue, it can be driven around smaller sheaves, and demonstrates improved load life. These cast belts may be vacuum spin cast in a single operation as contrasted to the numerous steps required to build conventional rubber tooth-type belts. However, many of the castable timing belts, and particularly those constructed of urethane, are often noiser and run hotter than a comparable rubber belt due primarily to the difference in coefficient of friction of the material. The urethane belt is generally more aggressive as it enters and leaves the sprocket or sheave and builds up considerable heat at the interfaces. This heat build-up reduces the efficiency of the belt and the higher operating temperatures can reduce belt life considerably by lowering the tear strength of the cog, or by attacking the bond between the elastomer body and tensile cord embedded therein.

One solution to the noise and heat-build-up problem is to reduce the coefficient of friction of the sheave-engaging surface of the belt by isolating or removing as much elastomer from mear the surfaces of the belt which come into contact with the sprocket teeth or flanges. This approach was taken in my above-mentioned co-pending application in which I was able to isolate a large portion of the elastomer from the sheave-engaging surfaces of the belt by incorporating a wear-resistant fabric layer along the surface of the belt together with the incorporation of cross cords in the body of the cogs, thus eliminating much of the elastomer in the critical areas. However, as acknowledged in my co-pending application, there was still present an outer skim coating of elastomer on the surface of the belt. This outer layer, even though relatively thin, e.g. about 2 mils in thickness, exhibits high abrasion and wear-resistance and by virtue of its high coefficient of friction causes significant increases in heating and noise level of the belt, particularly for heavy duty applications.

It is a primary object of the invention to provide a belt construction and method therefor which overcome drawbacks of prior constructions and in which the castable elastomer is isolated from the outer surface of the wear-resistant fabric layer positioned along the sheave-engaging surface of the belt.

SUMMARY OF THE INVENTION

Briefly described, the objects of the invention are met by the provision of an endless positive drive power transmission belt including a tensile-loaded body portion composed of a liquid cast elastomeric material, a plurality of spaced teeth bonded with and disposed along the inner periphery of the body portion, a layer of wear-resistant fabric positioned substantially along the periphery of the alternating land and teeth portions of the belt, and a layer of elastomer impervious material bonded so it preferably adheres to only a portion of the total thickness of the wear-resistant fabric and positioned along the outer, sheave-engaging face of the land and teeth portions of the belt.

According to the method, the above-described power transmission belt is produced by the steps comprising 1) bonding the elastomer impervious material to preferably only one side of the wear-resistant fabric layer, 2) forming a mold cavity defined by a mold mandrel and an outer shell, one of the mandrel or shell having a plurality of notches corresponding to the shape of the teeth or cogs, 3) wrapping the bonded wear-resistant fabric about the surface of the notched mold portion in a manner such that the layer of elastomer impervious material is adjacent the notched mold portion, 4) applying a tensile layer about the wear-resistant fabric, and 5) introducing a substantially liquid elastomeric material into the mold cavity and polymerizing the thus formed product.

BRIEF DESCRIPTION OF THE DRAWINGS

Preferred aspects of this invention will be described with reference to the accompanying drawings, in which like numerals designate like parts in the several figures, and wherein.

PREFERRED EMBODIMENTS OF THE INVENTION

Figure 1:
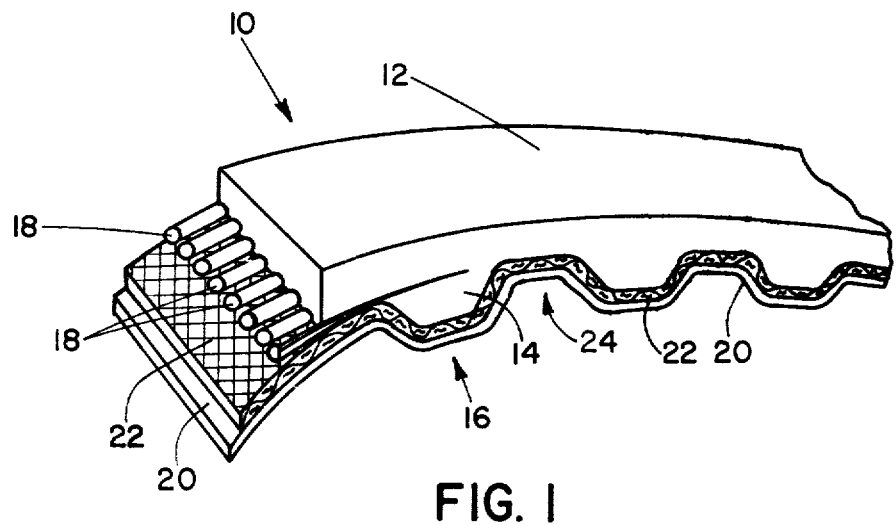
FIG. 1 is a fragmentary, perspective view of a power transmission belt made according to the invention.

Referring to FIG. 1, an endless cog-type power transmission belt is generally shown at 10. The belt includes a body having an overcord section 12 of a castable elastomeric material and a series of spaced cogs or teeth 16, also containing an elastomeric material 14. The elastomeric material utilized in the overcord and tooth body are compatible and may be of the same or different type elastomer. The elastomer overcord section 12 is preferably loaded with a reinforcing tensile layer or plurality of tensile members such as the longitudinally extending and spaced tensile cords 18. These tensile members may consist of one or more strands of a conventional stress-resistant material such as polyamide cord, fiber glass, polyester cord or wire filaments. The tensile members may be pre-stressed or impregnated with a suitable material if desired.

Various types of elastomeric materials are available which may be cast and which would be suitable according to the subject invention. Examples are curable liquid elastomers exemplified by plastisols, organosols, liquid chloroprenes, liquid polysulfides, liquid rubbers, silicones, epoxides, urethanes, carboxylated butadiene-acrylonitrile, polyester based resins, polyether based resins, and the like. Polyurethane elastomers are generally preferred at present because of their tensile strength, abrasion resistance and satisfactory modulus and elasticity. The polyurethanes may be prepared in conventional manner, such as by compounding a urethane prepolymer (formed by reaction of an active hydrogen-containing compound with a polyisocyanate) with a curing agent and an amount of plasticizer or other ingredient, if desired. Conventional curing agents may be utilized, such as organohydrogen-containing compounds exemplified by substituted aromatic amines.

Reinforcing fabric 22 intimately fits along the alternating teeth 16 and alternating land portions 24 of the belt to form a face cover therefor. This fabric may be of any desired configuration such as a conventional weave consisting of warp and weft threads at any desired angle, or may consist of warp threads held together by spaced pick cords, of a knitted or braided configuration, and the like. More than one ply of fabric may be employed. If desired, the fabric may be cut on a bias so that the strands form an angle with the direction of travel of the belt. Conventional fabrics may be employed using such materials as cotton, polyester, polyamide, hemp, jute, fiber glass and various other natural and synthetic fibers. In a preferred embodiment of the invention, the fabric layer 22 consists of an expansible wear-resistant fabric in which at least one of the warp or weft threads is made of nylon.

Figure 4:
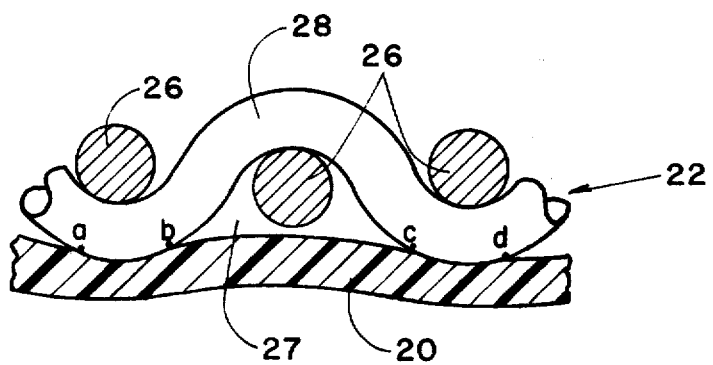
FIG. 4 is a schematic, blown up view of the bonded wear-resistant fabric layer utilized in the construction of the belt.

According to the invention, the wear-resistant fabric layer 22 carries an adherent layer of elastomer impervious material 20 bonded so it adheres to only a portion of the total thickness of the wear-resistant fabric and positioned along the outer, sheave-engaging face of the teeth and land portions of the belt. By elastomer impervious material is meant a material which adheres to one side of the wear-resistant fabric layer 22 so that during the casting operation the elastomer impervious material seals the outer side only of the fabric and thereby isolates the elastomer from the outer surface of the fabric layer by preventing the fibers on the outermost surface of the fabric layer from becoming completely encapsulated by elastomer; in this manner, the outer portion of the sheave-engaging surface of the fabric layer is substantially free of elastomer. This feature is illustrated in FIG. 4 of the drawings. Referring to that Figure, elastomer impervious material 20 is bonded to a portion of the outer surface of wear-resistant fabric layer 22 consisting in this case of a plurality of warp threads 26 and a plurality of weft or fill threads 28 (only one of which is shown). In this embodiment the sealing material 20 is bonded to the fill strand or fiber 28 between points $a$ and $b$, $c$ and $d$, which generate in three dimensions a pair of tangential contact zones or surfaces which might resemble the shape of a contact lens or an arch, for instance. While some of the elastomer may penetrate the volume 27 bounded by the elastomer impervious layer 20 and the surrounding warp threads 26 and weft threads 28, such penetration will not extend to the surface of the fabric layer which essentially alone engages the sheaves during operation.

It is critical to the invention that the elastomer impervious material 20 seal the outermost surface of the fabric layer so as to prevent the intrusion of elastomer into that area, and also of equal importance in the preferred embodiment that the innerside of the fabric layer be free from encroachment by the elastomer impervious material so that such innerside of the fabric may adequately adhere to the elastomer in the body of the belt and thus prevent the fabric from being stripped off the belt teeth during service. In this regard, while it is only necessary that the outer surface of the fabric layer be sealed and the innermost surface have sufficient free area for bonding with the elastomer body of the belt, it is preferred that the depth of penetration into the fabric layer of the elastomer impervious material be no more than about 60%, and more preferably no more than about 20%, and most preferably in the range of 4–8%. However, in the event the elastomer impervious material also is capable of forming a strong bond with the elastomer, the depth of penetration may be 100 percent.

The elastomer impervious material may be made from various types of materials and may be applied in a number of different ways according to the particular desired end use envisioned. In a preferred embodiment the elastomer impervious material consists of a polymeric sheet of thermoplastic material, for instance, which has been bonded to the wearresistant fabric by a conventional heat bonding technique utilizing elevated temperature and pressure. Polyethylene sheeting of 1–2 mils in thickness has been found satisfactory for this purpose; the bonding temperature may be 230°–250°F and the pressure varied so that upon casting the elastomer is unable to penetrate and encapsulate the outer fibers of the fabric. A double platen press may be used in this regard. Various other types of sheeting material, such as contact paper and films or membranes of copolymeric synthetic materials and various natural materials such as cellulosic materials are useful. The invention also contemplates the alternative treatment of the wear-resistant fabric layer by such means as calendaring, brushing, dipping or spraying preferably on one side only of the fabric with a suitable sealant. For instance, a paste or resinous layer of a polymeric material dispersed or dissolved in a suitable carrier or solvent can be applied to one surface of the fabric. Latex and silicone are examples of useful materials. Similarly, the fabric surface can be treated by applying a layer of polytetrafluoroethylene. In any event, the bond between the elastomer impervious material and wear-resistant fabric may be mechanical, chemical, electrostatic, etc.

It is contemplated in a preferred embodiment of the invention that the elastomer impervious material may suitably have very poor abrasion resistance so that upon use of the belting material the layer of material will partially or fully wear off, leaving an outer, elastomer-free surface of the wear-resistant fabric for engagement with the rotating sheave. Polyethylene sheeting will readily wear off in this manner. Inasmuch as the elastomer body of the belt has been fully cured, there will be no tendency for it to bleed or permeate through the interstices in the outer fabric layer during use which would otherwise present the undesirable contact of the elastomer with the sheave.

Alternatively, the elastomer impervious material may be made of a material which has good abrasion resistance and which will therefore remain on the inner surface of the cogs and land portion of the belt throughout at least a significant portion of its life. In this case, the polymer impervious material must have a coefficient of friction which is significantly lower than the coefficient of friction of the elastomer utilized to thereby lower heat build-up, reduce noise and improve the overall efficiency of the belt.

Figure 2:
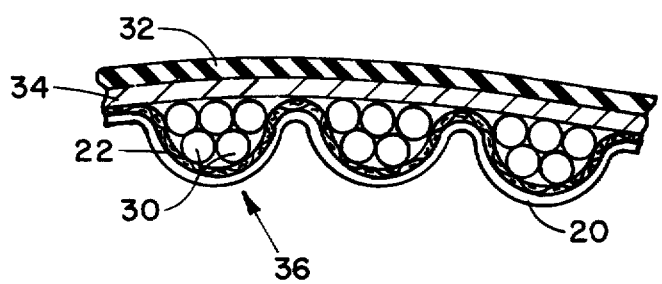
FIG. 2 is a longitudinal cross-sectional fragmentary view of a high-torque timing belt made according to the invention.

An alternative belt configuration is shown in FIG. 2 which, unlike the standard pitch-type shown in FIG. 1, is designed for high-torque capability. This belt, with the exception of the peripheral elastomer impervious layer 20 is described in my aforementioned co-pending application. This belt consists of the usual elastomeric overcord section 32 containing a circumferentially extending tensile cords or layer 34. The undercord of the belt carries a plurality of spaced teeth or cogs 36 which have an outer wear and abrasion resistant fabric 22 to which is bonded elastomer impervious layer 20. A plurality of transverse members 30 fill a major proportion of the cogs 36 and particularly fill the vertical distance between the tensile member 34 and the addendum of the cogs. Both the transverse members 30 and wear-resistant fabric cover 22 combine to minimize the amount of elastomer in the area of the cogs. Furthermore, according to the invention the elastomer impervious layer 20 substantially isolates the elastomer from the sheave-engaging surface of the belt.

A polyurethane belt essentially identical to the construction shown in FIG. 2 was tested and found to operate at a temperature in the range of 160°–180°F. The identical belt without the elastomer impervious layer 20 and with a skim layer of polyurethane was operated under the same conditions and found to generate temperatures in the range of 200°–240°F. Belts of the construction of the subject invention have averaged about 35°F. lower in running temperature than the same belt without the (initial) elastomer impervious layer. Load life tests have shown that the life of all types of V-belts generally doubles for every 18°F. cooler operating temperature increment. (See Lundstrom and Schock, *Machine Design*, Dec. 9, 1971, pp 129–130). The cooler running temperature of the timing belt of the subject invention is mostly attributable to the isolation of the elastomer from the surface.

Figure 3:
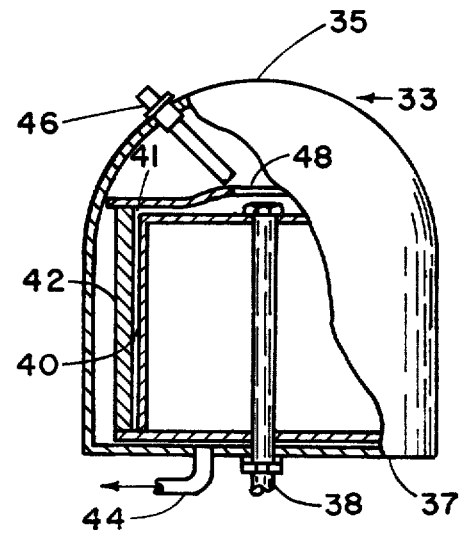
FIG. 3 depicts mold apparatus for manufacturing the belts according to the invention.

An apparatus suitable for casting either of the cog belts of FIG. 1 or FIG. 2 is shown in FIG. 3. A preferred general technique for producing belts according to the invention is described particularly in my aforementioned co-pending application, in U.S. Pat. No. 3,138,962 (Haines et al) and U.S. Pat. No. 3,200,180 (Russ et al). As shown in FIG. 3, a casting assembly 33 broadly comprises an outer vacuum chamber 35, a platform 37 upon which the vacuum chamber rests, a central rotatable shaft 38 extending from the outside of the vacuum chamber through the platform into the chamber upon which is supported an interior mandrel 40, and an outer-spaced concentric mold shell 42. The vacuum chamber may be evacuated by an exhaust line 44, which is connected to a vacuum pump (not shown). Liquid casting material is introduced by means of an entry port 46 which is directed toward the top of a distributing plate 48. As the assembly is rotated, the liquid elastomer is forced to the outer regions by means of centrifugal force and by means of a baffle system and guide system incorporated as part of the distributing plate 48. On the outer region of the plate, the liquid is then directed to annular cavity 41 between the central mandrel 40 and the outer mold shell 42.

The details of the mandrel and outer mold shell configuration are set forth in my aforementioned co-pending application. Normally, the mandrel 40 will have spaced axially extending notches and alternating upstanding portions which correspond to the cogs and land portions of the belt, respectively.

In the method of the invention, the elastomer impervious material is first bonded or otherwise adhered to one side only of the wear-resistant fabric resulting in a configuration exemplified in FIG. 4. The bonded wear-resistant fabric may then be wrapped around the surface of the notched mold portion (e.g. mandrel) in a manner such that the layer of elastomer impervious material is adjacent the notched mold portion. The wear-resistant layer may be made to conform to the notched mold portion by weaving in the notches the cross cord members, as described in the aforementioned co-pending application. The next step involves applying a tensile layer, such as by helically winding tensile cord around the circumference of the notched mandrel on top of the wear-resistant fabric layer, forcing the bonded fabric to essentially conform to the surface of the notches. Finally, a substantially liquid elastomeric material is introduced into the mold cavity and the material is polymerized to form the desired belt configuration. Centrifugal casting combined with applied vacuum may be employed for good results.

After polymerization has taken place and sufficient cure time allowed, the mold may be disassembled and the resultant sleeve of belts cut into individual belts of desired width. A skiving operation may be employed to give the desired final configuration to the teeth and/or the overcord side of the belt. In this latter regard, the overcord of the belt may carry multiple V's, cogs, or other configurations as desired.

It should be understood that the invention is capable or a variety of modifications and variations which will become apparent to those skilled in the art upon a reading of this specification. Such modifications and variations and equivalents are intended to be a part of the scope of the invention as defined by the appended claims.

What is claimed is:

1. In a method for producing a positive drive castable elastomeric power transmission belt having a plurality of spaced cogs attached to a body section including a tensile section, said cogs having positioned approximately along their surface a layer of wear-resistant fabric, the improvement comprising isolating the cast elastomer from the outer surface of the fabric layer by the steps of:

adhering to one side of the wear-resistant fabric a layer of elastomer impervious material which has been cured or set, the layer of elastomer impervious material penetrating into and sealing said outer surface of the fabric layer, said elastomer impervious material being a material of the same type or different type from the cast elastomer;

forming a mold cavity defined by a mold mandrel and an outer shell, one of said mandrel or shell having a plurality of notches corresponding to the shape of the cog;

wrapping the bonded wear-resistant fabric about the surface of the notched mold portion in a manner such that the layer of elastomer impervious material is adjacent the notched mold portion;

applying a tensile layer about the wear-resistant fabric; and introducing a substantially liquid elastomeric material into the mold cavity and polemerizing the thus formed product, whereby the liquid elastomeric material does not penetrate the outer surface of the fabric layer.

2. The method of claim 1 wherein the elastomer impervious material consists of a thin polymeric sheet.

3. The method of claim 2 wherein polyethylene sheet is heat bonded to one side only of the wear-resistant fabric at a temperature and pressure so that the polyethylene penetrates through the surface on the bonding side of the wear-resistant fabric, but does not penetrate the opposite surface of the wear-resistant fabric.

4. The method of claim 3 wherein the temperature is maintained in the range from about 230° to about 250°F.

5. The method of claim 1 wherein the layer of elastomer impervious material is brought adjacent the notched mold portion by the use of fibrous cross cords which are wound about the notches of the mandrel and which are forced against the wear-resistant fabric by winding the tensile layer on top of such fibrous cross cords urging the wear-resistant fabric into the notches.

6. The method of claim 1 wherein the elastomer impervious material has poor abrasion resistance whereupon rotation of the belt about a cooperating sheave will cause the elastomer impervious material to at least partially wear off.

7. The method of claim 1 wherein the layer of elastomer impervious material forms a strong bond with the cast elastomer and further wherein the depth of penetration of the elastomer impervious material into the wear-resistant fabric layer is substantially 100 percent.

8. A method for the production of positive drive liquid castable elastomeric power transmission belts including a plurality of teeth loaded with the cast elastomer and disposed along the driving surface of the belt, the teeth carrying on their outer surface a wear-resistant fabric layer the outermost driving surface portion of which is substantially free of said cast elastomer, comprising the steps of:
attaching to at least one side of the wear-resistant fabric a layer of material impervious to the liquid castable elastomer, the layer of impervious material penetrating into and sealing said outermost surface of the fabric layer;
forming a mold cavity between a mandrel and an outer shell, one of said mandrel or shell having a plurality of notches;
disposing the wear-resistant fabric with the attached elastomer impervious material within the cavity in a manner such that the layer of elastomer impervious material is adjacent the notches, the side of the wear-resistant fabric opposite the side adjacent the notches having sufficient free area for bonding with the elastomer of the teeth;
applying a tensile layer about the wear-resistant fabric;
introducing a substantially liquid elastomeric material into the mold cavity, whereby the liquid elastomeric material does not penetrate said outermost surface of the fabric layer;
polymerizing the thus formed product; and
removing the elastomer impervious material from the adjacent wear-resistant fabric whereby the outermost driving surface portion of the fabric layer exposed is free of the cast elastomer.

9. The method of claim 8 wherein the elastomer impervious material is bonded to the wear-resistant fabric so that the elastomer impervious material penetrates no more than 60% of the depth of the fabric layer.

10. The method of claim 8 wherein the wear-resistant fabric is made of a fibrous layer, the fibers along said outermost driving portion being free from total encapsulation by the elastomer in the finished belt.

11. The method of claim 8 wherein the elastomer impervious material has poor abrasion resistance, and including the further step of operating said belt in a cooperating sprocket drive so as to at least partially wear off said polymer impervious material from the belt.

12. The method of claim 8 wherein the polymer impervious material is formed of a polymeric sheet which has significantly lower coefficient of friction than the elastomeric material of the belt.

13. A method for producing a liquid cast polyurethane positive drive power transmission belt having a polyurethane body, a tensile section disposed within said body, and a series of polyurethane-containing teeth integral with the body and positioned along the inner peripheral surface of the belt and having an outer fabric surface bonded to the teeth, the outermost driving surface portion of which is substantially free of urethane, comprising the steps of:
bonding to one side of the wear-resistant fabric a layer of polyurethane impervious material, the layer of polyurethane impervious material being composed of a material other than polyurethane and penetrating into and sealing said outermost surface of the fabric layer, with the depth of penetration of the polyurethane impervious material being no more than about 60% of the thickness of the wear-resistant fabric;
forming a mold cavity between a notched mold mandrel and an outer shell, said notches corresponding to the teeth to be formed in the positive drive belt;
wrapping the bonded wear-resistant fabric about the notched mold mandrel in a manner such that the layer of polyurethane impervious material is made to substantially conform to the notches in the mold, the side of the wear-resistant fabric opposite the notches having sufficient free area to bond to the urethane of the belt;
applying a tensile layer;
introducing a substantially liquid polyurethane material into the mold cavity, whereby the urethane impervious material prevents the liquid urethane introduced into the mold from penetrating said outermost surface of the fabric layer adjacent the notched mold portion;
polymerizing the thus formed product to produce a sleeve of belting from which one or more positive drive endless belts may be made.

14. The method of claim 13 wherein the depth of penetration of the urethane impervious material into the wear-resistant fabric layer is no more than about 20%.

15. The method of claim 13 wherein the depth of penetration of the urethane impervious material into the wear-resistant fabric layer is in the range from about 4 to about 8%.

16. The method of claim 13 wherein the urethane impervious material is formed of a polymeric sheeting which is made to be heat bonded to the wear-resistant fabric layer, said polymeric sheeting having a coefficient of friction less than the coefficient of friction of the urethane.

17. The method of claim 13 wherein the urethane impervious material has good abrasion resistance and a coefficient of friction which is significantly lower than the coefficient of friction of the urethane.

18. A method for the production of positive drive liquid castable elastomeric power transmission belts including a plurality of teeth loaded with the cast elastomer and disposed along the driving surface of the belt, the teeth carrying on their outer surface a wear-resistant fabric layer the outermost driving surface portion of which is substantially free of said cast elastomer, comprising the steps of:

attaching to at least one side of the wear-resistant fabric a layer of polymeric thermoplastic material which is impervious to the liquid castable elastomer, the layer of thermoplastic material penetrating into and sealing said outermost surface of the fabric layer, the depth of penetration of the thermoplastic material into the fabric layer being at least 4 percent, and said thermoplastic material being a material distinct from the cast elastomer;

forming a mold cavity between a mandrel and an outer shell, one of said mandrel or shell having a plurality of notches;

disposing the wear-resistant fabric with the attached thermoplastic material within the cavity in a manner such that the layer of thermoplastic material is adjacent the notches, the side of the wear-resistant fabric opposite the side adjacent the notches having sufficient free area for bonding with the elastomer of the teeth;

applying a tensile band about the wear-resistant fabric;

introducing a substantially liquid elastomeric material into the mold cavity, whereby the liquid elastomeric material does not penetrate said outermost surface of the fabric layer; and polymerizing the thus formed product.

* * * * *